United States Patent [19]

Bradbury

[11] 4,221,753
[45] Sep. 9, 1980

[54] EXTRUSION PROCESS

[75] Inventor: Christopher G. Bradbury, Rumford, R.I.

[73] Assignee: Leesona Corporation, Warwick, R.I.

[21] Appl. No.: 865,015

[22] Filed: Dec. 27, 1977

[51] Int. Cl.³ .............................................. B28B 11/16
[52] U.S. Cl. ................................. 264/142; 264/143;
  264/169; 425/97; 425/311; 425/313
[58] Field of Search .............. 264/142, 143, 169, 141;
  425/382.2, 313, 464, 97, 144, 311

[56] References Cited
U.S. PATENT DOCUMENTS

| | | | |
|---|---|---|---|
| 2,987,776 | 6/1961 | Miller et al. | 264/169 |
| 3,054,142 | 9/1962 | Hinderer et al. | 264/169 |
| 3,095,608 | 7/1963 | Munsell | 264/169 |
| 3,516,120 | 6/1970 | Braun et al. | 425/382.2 |
| 3,599,286 | 6/1971 | Karet | 425/464 |
| 3,981,959 | 9/1976 | Cuff | 264/142 |
| 4,112,039 | 9/1978 | Cuff | 264/176 F |

*Primary Examiner*—Jay H. Woo
*Attorney, Agent, or Firm*—Robert J. Doherty

[57] ABSTRACT

An extrusion process is disclosed wherein coolant under pressure is directed against the outer surface of a thermoplastic material being forced through an extrusion orifice such that at least a portion of the coolant immediately vaporizes and the resultant heat of vaporization required for such action is taken from the material immediately contacting such. The coolant is introduced into an intermediate zone downstream from an initial extrusion zone and the interface between such zones is insulated so as to restrict conductive heat transfer between such zones immediately adjacent thereto so as to prevent possible freeze ups of said material in the initial extrusion zone.

3 Claims, 2 Drawing Figures

EXTRUSION PROCESS

BACKGROUND OF THE INVENTION

This invention is an improvement of a recently introduced and unique in-die strand-quenching process disclosed in U.S. Pat. No. 3,981,959 issued Sept. 21, 1976, to the assignee of the present application, namely, Leesona Corporation. In such patent, a system which permits drastically increased pelletizing operation efficiencies by means of introduction of a liquid coolant under pressure into direct contact with the outer surface of a polymeric or other thermoplastic material passing through it, is disclosed. As the coolant enters the die orifice, a portion thereof is immediately vaporized to form at least a solidified outer wall of material surrounding an inner and still somewhat liquid material core. The wall of the orifice is simultaneously lubricated by non-vaporized coolant to facilitate its passage through the die. Such system, also contemplates particularly when utilizing polymeric materials, although not necessarily so, the subsequent cutting of the resultant strands into discrete material lengths or pellets by knives mounted for rotation in respect to the exit face of the die.

In addition to thermoplastic polymeric material such as polyethylene, polyproplylene, polyvinylchloride, etc., the process has applicability to other thermoplastic materials such as glass and various metals.

The above described system generally utilizes a porous member through which the liquid coolant is forced, such member being disposed in an intermediate zone of the extrusion orifice through which the material passes. Because of the high coolant efficiencies involved, portions of such member are necessarily cooler than the portions of the die forming the upstream die orifice. On some occasions the relative lower temperature of the porous member can be transmitted by conduction upstream to the oncoming material to an extent to permit a presolidification thereof sooner than desired. Additionally, upon start-up it takes some time for the various temperature gradients between various components making up the die to thermally equalize to a steady state operation. Fairly immediate achievement of such steady state operation is desirable so as to reduce throughput of unacceptable product upon start-up operations. It is accordingly an object of the present invention to overcome such potential operational aspects of the system in an inexpensive and straightforward manner.

A further object of the present invention is the provision of a method for insulating from conductive heat transfer, the initial and intermediate extrusion zones of the aforementioned system so that steady state operational temperatures can be rapidly achieved and sustained during start-up.

These and other objects of the present invention are accomplished by the provision of a novel extrusion method comprising the introduction of an insulative insert between the initial and intermediate extrusion zones of an extrusion system wherein heated thermoplastic material is forced into the initial zone of an extrusion die having at least one extrusion orifice, forcing said material through said orifice and outward of said die in rod or stand-like form while forming an at least solidified outer wall structure surrounding a more fluid inner core of said material at a higher temperature. In such procedure, a liquid coolant under pressure is forced into the intermediate zone of said extrusion so as to contact the outer surface of said material passing therethrough. The coolant is at least partially vaporized simultaneously to quickly form said solidified outer wall structure and to provide a lubricating film between the inner wall of said orifice material to facilitate passage of said material therethrough.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figure 1:
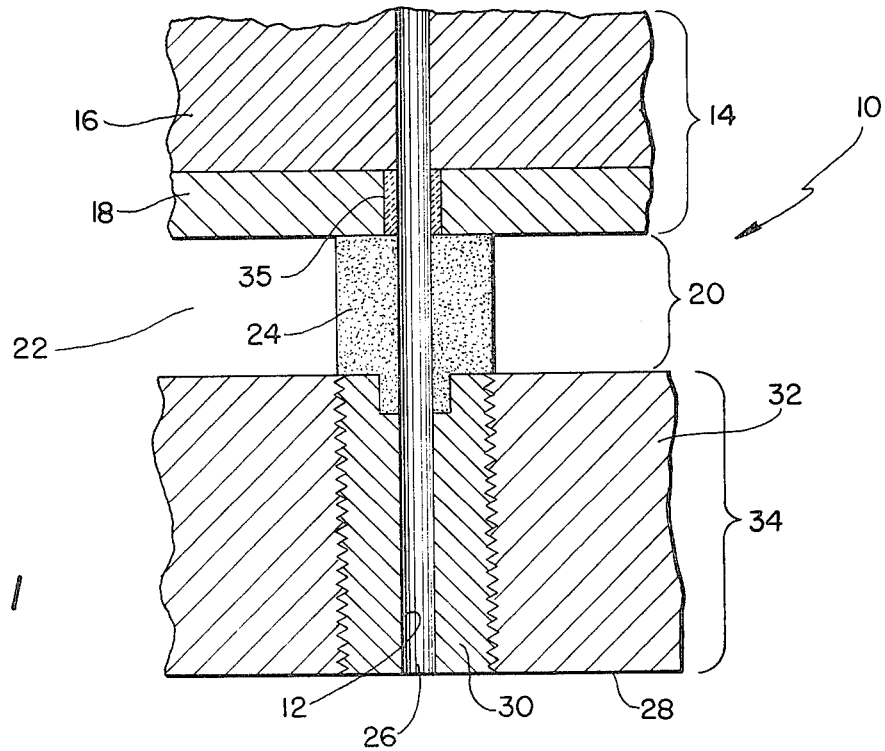
FIG. 1 is a cross-sectional view in stylized form of an extrusion die showing one form of the present invention in which steady state temperature between the relative die components thereof is quickly achieved.

Turning now to the drawing and in particular FIG. 1 thereof, an extrusion die 10 is shown. Such die is generally of ring-like configuration and includes a plurality of extrusion orifices 12 adapted for operative engagement with a source of heated thermoplastic material (not shown) such as an extruder in the case of polymeric thermoplastic materials and a casting device as with glass or metal thermoplastic material. An initial extrusion zone 14 is formed by die components 16 and 18. After passing through said initial zone, the material passes into an intermediate zone 20 wherein coolant under pressure, i.e. water is introduced through a suitable conduit means (not shown) into a chamber 22 comprising a portion of said intermediate zone and thence through a porous member or body 24 into direct contact with the outer surface of the material filling the extrusion orifice 12.

As soon as the coolant comes in contact with the material, by reason of accompanying pressure reduction, a part of the coolant is immediately vaporized and accordingly quickly, by heat of vaporization and temperature reduction transfer, removes an extensive amount of heat contained within the material. Although the system is hydraulically open, that is, the extrusion orifice 12 exists at opening 26 in the outer die face 28 in an unrestrained manner, a portion of the liquid coolant is maintained in a liquid state as it passes along the extrusion orifice 12 to the exit face 26 thereof. Thus a pressure gradient is set up within the extrusion orifice 12 from a high pressure end at the initial zone 14 thereof to an ambient or low pressure end at the exit 26 thereof. Accordingly, coolant gradients at the surface of the material strand as it progresses through the orifice 12 are established and accordingly additional cooling may take place after the intermediate zone. The higher than ambient pressures within the extrusion orifice 12 permits the liquid phase to be present even though temperatures considerably higher than that which would permit liquid phase at normal atmosphere pressures are maintained in the orifice 12.

It is thus believed that a combination of vapor, that is, vaporized water and liquid phase water are present between the outside surface of the material being extruded and the inside surface of the orifice 12 in such a manner so as to form an effective combination coolant, lubrication and insulative film or medium for the material as it passes therethrough. The above explanation is believed to be what takes place in the extrusion orifice 12 although other explanations consistent with the effective passage of the material therethrough and the formation of a solidified or cooled skin surrounding an inner core of higher temperature more liquid material as the material in rod or strand-like form emerges from the exit passage 26 of the die face 28 may exist.

Generally the coolant utilized is water because of its low-cost and availability, however, other coolants which are generally non-reactive and immiscible to the thermoplastic material being processed may also be utilized. The terms non-reactive and immiscible as used herein distinguish materials in a quantiative sense, that is, do not exclude materials which could be miscible to an insignificant degree with the material being processed or might be reactive to a non-harmful extent therewith. It is also generally contemplated that the member 24 is formed of a porous metal material such as is available from the compression or sintering of powdered metal materials, however, other materials may be utilized such as those formed by a plurality of superposed material mesh elements, the essential characteristic being that the material utilized for the member 24 is capable of resisting the temperature of the material passing through the intermediate zone and will permit the passage of coolant therethrough in the desired manner and still form a portion of the extrusion orifice 12 as contemplated.

The porous member 24 may be secured to the die 10 by means of an insert 30 threadably or otherwise positioned within the outer section 32 of the die body. The portion of the die downstream from the porous member 24, provides a final extrusion zone 34 in which the material is contained in the form of a rod or strand-like configuration having an outer solidified surface during its passage through the die. Upon emergence from the die face 28, a cutter may be positioned to cut the rod in the case of polymeric thermoplastic material into discrete pellets or as in the case of metal or glass, the rod may be transported for further processing or use in such form.

Because of the strong cooling action provided by the depressurized coolant particularly by reason of the induced ebullition (heat of vaporization effect) upon the surface of the thermoplastic material and the heated die surfaces in which the coolant comes in contact with, considerable time is normally necessary for the process upon start-up to reach a steady state temperature equilibrium. Because of such strong cooling effect, it is possible during start-up, when the die components of the system have not reached their operating temperature, to cause solidification of material not only downstream of the intermediate zone 20 but in some occasions upstream thereof in the initial extrusion zone 14. This is primarily due to the conductive cooling effect between those die components 16 and 18 adjacent the chamber 22 and the porous member 24. In order to overcome this possible effect, various start-up procedures requiring the modification of coolant and material temperatures must be made until the desired operational temperature equilibrium through the various components of the die 10 are achieved. It is also possible that such above indicated solidification could occur other than during start up.

In order to reduce these effects and to enable temperature equilibrium to be achieved in a shorter period of time, it has been found that the introduction of an insulative element 35 surrounding the die orifice 12 and forming a part thereof contributes to this desirable outcome. The element 35 is generally cylindrical in nature and formed from an insulative material which will further retain its shape and insulative characteristics when subjected to the temperatures of the material passing through the orifice. The element 35 is shown in cylindrical form and held in place by the removable die element 18. Suitable materials for the construction of element 35 include ceramic materials and tungsten carbide. Essentially then, the insulative element 35 is disposed between and adjacent the initial and intermediate zones 14 and 20 respectively.

Figure 2:
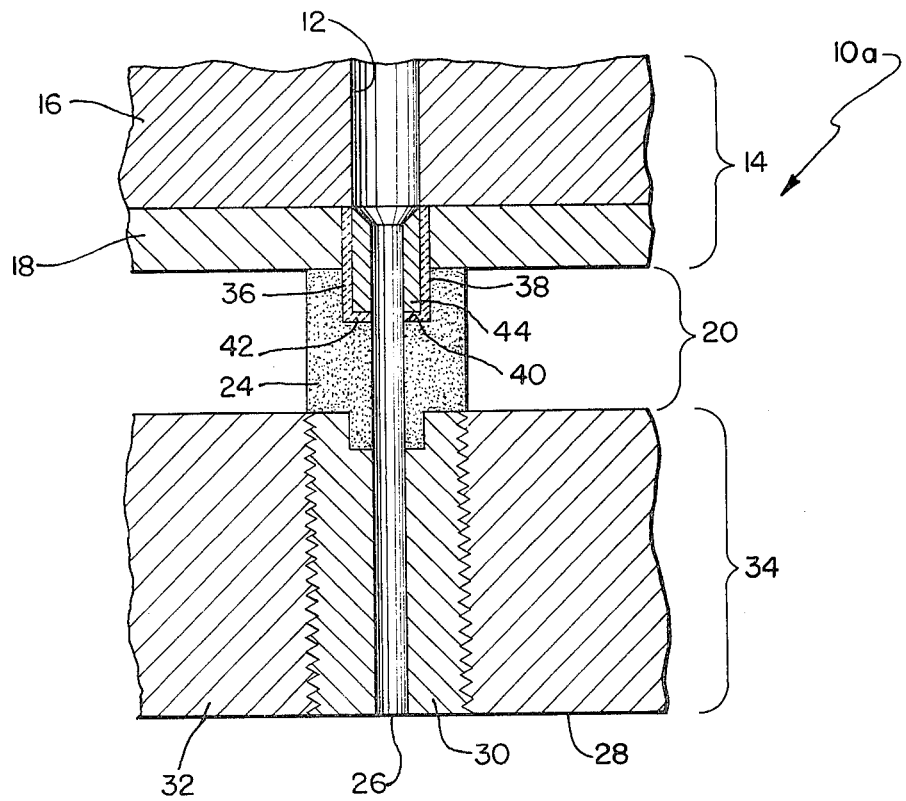
FIG. 2 is a view similar to FIG. 1 showing a modified form of the present invention.

An insulative element 36 of modified die construction 10a is shown in FIG. 2. This element includes a cylindrical portion 38 and an inwardly extending flange 40 which in turn is adapted to rest upon an inwardly extending shoulder 42 formed within the porous member 24 at the top portion thereof. The flange 40 in turn provides a seat for an insert 44. The insert in such embodiment forms a portion of the extrusion orifice 12. Such configuration as shown in FIG. 2 is particularly useful when the materials being extruded are fluid at particularly elevated temperatures which could be destructive to the materials forming the element 36 yet enable the same insulative effect as in FIG. 1 to be achieved.

It may also be desirable in some cases to provide an additional insert (not shown) at the horizontal interface between the initial and intermediate zones 14 and 20 in either die construction 10 or 10a. Such a portion or extension could thus be held between the adjacent faces of the movable die component 18 and the porous member 24 by the force of insert 30 or other appropriate means.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In the method of extruding thermoplastic material comprising, heating said material to make it fluid, conveying said material into an extrusion die having a plurality of extrusion orifices, each said orifice including initial, intermediate and final zones wherein said zones are disposed respectively adjacent each other, said final zone terminating in an exit opening for said material in an outer die face, forcing said material into the initial zone of said orifices and thereafter out of the final zones thereof and thus out of said die in a rod or strand-like form having a solidified outer wall structure surrounding a more fluid core of said material at a higher temperature, directing a liquid coolant under pressure into said intermediate zone of said extrusion orifice downstream from said initial zone and upstream of said final zone to contact the outer surface of said material passing therethrough while at least partially vaporizing said coolant to simultaneously form said solidified outer wall structure and to provide a lubricating film between the inner wall of said orifice and said material to facilitate passage of said material therethrough, wherein a porous member is disposed in said intermediate zone and said liquid coolant is forced through said member; the improvement comprising, thermally insulating said porous member from the initial zone of said extrusion orifice adjacent said porous member so as to at least partially reduce conductive heat transfer from said liquid coolant to that portion of said extrusion orifice upstream of said porous member and disposed in said initial zone and adjacent said intermediate zone, and at a location remote from said outer die face wherein said material leaves the die.

2. The method of claim 1, wherein at least that part of said member disposed in said intermediate zone and adjacent to said initial zone is insulated in addition to said adjacent portion of said orifice in said initial zone.

3. The method of claim 1, wherein said material is polymeric and said strand as it emerges from said die is cut into the form of discrete pellets.

* * * * *